US008326643B1

(12) United States Patent
Eshkenazi et al.

(10) Patent No.: US 8,326,643 B1
(45) Date of Patent: Dec. 4, 2012

(54) SYSTEMS AND METHODS FOR AUTOMATED PHONE CONVERSATION ANALYSIS

(75) Inventors: Nikolay Eshkenazi, San Antonio, TX (US); Gregory Neal Lewis, San Antonio, TX (US); Mark Richter, San Antonio, TX (US)

(73) Assignee: United Services Automobile Association (USAA), San Antonio, TX (US)

( * ) Notice: Subject to any disclaimer, the term of this patent is extended or adjusted under 35 U.S.C. 154(b) by 1520 days.

(21) Appl. No.: 11/511,593

(22) Filed: Aug. 28, 2006

(51) Int. Cl.
*G06Q 10/00* (2006.01)
(52) U.S. Cl. .................................. 705/1.1; 379/265.06
(58) Field of Classification Search ........... 705/1–14.58; 704/231–260; 379/265.01–266.1
See application file for complete search history.

(56) References Cited

U.S. PATENT DOCUMENTS

| | | | | | |
|---|---|---|---|---|---|
| 5,884,039 | A * | 3/1999 | Ludwig et al. | ................ | 709/227 |
| 5,924,077 | A * | 7/1999 | Beach et al. | .................... | 705/10 |
| 6,033,226 | A * | 3/2000 | Bullen | .......................... | 434/219 |
| 6,574,605 | B1 * | 6/2003 | Sanders et al. | .................... | 705/8 |
| 6,606,644 | B1 * | 8/2003 | Ford et al. | .................... | 709/203 |
| 6,687,671 | B2 * | 2/2004 | Gudorf et al. | ................ | 704/235 |
| 6,959,078 | B1 * | 10/2005 | Eilbacher et al. | ........ | 379/265.03 |
| 7,672,845 | B2 * | 3/2010 | Beranek et al. | .............. | 704/251 |
| 7,860,722 | B1 * | 12/2010 | Chow | ............................. | 705/1.1 |
| 2002/0133392 | A1 * | 9/2002 | Angel et al. | .................... | 705/10 |
| 2002/0169606 | A1 * | 11/2002 | Bantz et al. | ................... | 704/235 |
| 2003/0105697 | A1 * | 6/2003 | Griffin et al. | .................. | 705/36 |
| 2004/0015605 | A1 * | 1/2004 | Demetriades et al. | ........ | 709/238 |
| 2004/0024483 | A1 * | 2/2004 | Holcombe | ..................... | 700/122 |
| 2004/0249650 | A1 * | 12/2004 | Freedman et al. | ................ | 705/1 |
| 2004/0264652 | A1 * | 12/2004 | Erhart et al. | ............... | 379/88.01 |
| 2006/0167942 | A1 * | 7/2006 | Lucas et al. | ................ | 707/104.1 |
| 2006/0171511 | A1 * | 8/2006 | Liu et al. | ....................... | 379/67.1 |
| 2006/0262919 | A1 * | 11/2006 | Danson et al. | ........... | 379/265.02 |
| 2006/0265089 | A1 * | 11/2006 | Conway et al. | .................. | 700/94 |
| 2007/0112614 | A1 * | 5/2007 | Maga et al. | ..................... | 705/10 |
| 2007/0201644 | A1 * | 8/2007 | Metcalf | .................... | 379/114.28 |

OTHER PUBLICATIONS

Angel.com, "Call Analyzer," http://www.angel.com/enterprise/callAnalyzer.jsp, 2006, 3 pages.
Carahsoft Technology Corp., "CallMiner: The Callminer Analytics Suite Solves the Contact Center's Most Daunting Challenge," http://www.carahsoft.com/callminer/index.html, downloaded Aug. 7, 2006, 4 pages.
Genesys, "Genesys Inbound Voice: segments customers, monitors agent availability, recognizes agent skill-set, and delivers the customer to the right agent the first time—regardless of location," www.genesyslab.com/contact_center/products/interactions/inbound_voice.asp, downloaded Jun. 2006, 2 pages.

(Continued)

*Primary Examiner* — Yuwen Pan
*Assistant Examiner* — Assad Mohammed
(74) *Attorney, Agent, or Firm* — Brooks, Cameron & Huebsch, PLLC

(57) ABSTRACT

A system for providing phone conversation analysis may comprise at least one subsystem that monitors a phone conversation for key words or key phrases as defined by business rules. Conversations containing such words may be tagged with appropriate metadata to identify the conversation for subsequent analysis, and for conducting trending and analysis of the collected data. Also, a system for providing phone conversation analysis may comprise subsystems for monitoring a phone conversation for key words or key phrases, and associating the key words or key phrases with pre-determined offers or services.

21 Claims, 10 Drawing Sheets

OTHER PUBLICATIONS

Genesys, "Genesys Voice Platform brings Internet technologies to voice self-service / IVR solutions that enable your customers to conduct business over the phone in a new and intuitive way," www.genesyslab.com/contact_center/products/interactions/inbound_voice.asp, downloaded Jun. 2006, 2 pages.

Nuance, "OpenSpeech Recognizer : The Industry's Most Accurate, Versatile and Efficient Speech Recognizer," www.nuance.com/recognizer/, downloaded Jun. 2006, 2 pages.

SpeechWorks solutions from ScanSoft, "Open Speech Recognizer: An Intelligent, Scalable, and Comprehensive Speech Recognition Solution from SpeechWorks," Jun. 2005, 20 pages.

VirtualQC, "Remote Monitoring that's Close to Perfect," www.voicelog.com/virtual-qc.html, downloaded Jun. 2006, 2 pages.

VoiceLog LLC; Voip Phone System, Call Center Expert Witness, "VirtualTranscript: Data transcribed from your recordings or ours," http://www.voicelog.com/virtual-transcript.html, 2005, 1 page.

Voice Print International Inc.; Activ! View—Screen Recording Software, "Realize the Potential of Captured Information with Voice Print's *Activ! View* Desktop Screen Recording Software," http://www.voiceprintonline.com/screen-capture-software.asp, 2006, 3 pages.

* cited by examiner

SYSTEMS AND METHODS FOR AUTOMATED PHONE CONVERSATION ANALYSIS

BACKGROUND

Customer service call centers must find the best way to identify and satisfy a wide variety of customer demands. Typically, customers call needing information, or to request some action, or some combination of the two. Another task carried out in call center operations is providing customers with helpful and relevant information that is not necessarily related to the particular issue the customer called about, such as information regarding additional products the customer may be interested in.

Phone conversations may be recorded in call centers for a variety of reasons. In a typical setting, phone conversations may be recorded for use in training call center employees. A call that was handled well may be replayed to demonstrate techniques that were used to identify and resolve the customer's issue. Alternatively, conversations that went poorly may be used to illustrate what can go wrong, and to coach employees in techniques that may be used to avoid such situations.

A database with a large number of recorded conversations can be difficult to use effectively. Some conversations may be known to a manager as good examples for a particular training scenario, but it can be difficult to find good examples for other scenarios without listening to each and every conversation in the database. Moreover, even if a conversation is identified, it may be difficult to subsequently identify the particular portion of the recorded conversation that is desired.

Furthermore, recorded phone conversations may contain a wealth of valuable information about the customers who called. For example, a customer may mention or imply circumstances in their life that indicate the customer may benefit from a particular product. Customers from particular geographical areas may be identified as frequently calling about similar issues. A wide variety of valuable data may be obtainable from recorded conversations, however present systems do not allow adequate access to such data in a cost-effective way.

Customer service agents typically interact with Customer Relations Management (CRM) software while they are talking with customers. The CRM may provide information about the customer's account and so forth. Such software is certainly useful in facilitating helping the customer with their specific issue, however, the human customer service agent is relied upon to know of additional products or services that are desirable or beneficial to one in the customer's circumstances. The customer or agent may not be aware of, or may not have time to analyze all the needs or possible circumstances of the customer during the conversation while also addressing the specific issue at hand.

Additionally, it may be desirable to provide customers with assistance based on the circumstances of the customer revealed by the contents of previous phone conversations. However, recordings of previous phone conversations with the customer might not exist, and even if they did, might be too large to listen to and analyze for what additional services or products would be helpful to the customer. Furthermore, emerging trends and patterns that point to the need for additional services or products may not be immediately apparent without analyzing data from a larger database of phone conversations.

Thus, systems, processes and computer readable media are needed to address the shortcomings of the prior art.

SUMMARY

In consideration of the above-identified shortcomings of the art, automated phone conversation analysis is provided. For several embodiments, a system for providing phone conversation analysis comprises at least one subsystem that automatically performs real time voice recognition, recognizes at least one key word or key phrase during a phone conversation between a customer and a human agent, and tags the phone conversation for efficient retrieval. At least one subsystem performs a pre-determined action based on the key words or key phrases recognized.

Also, a system for providing phone conversation analysis may comprise at least one subsystem that monitors a phone conversation for key words or key phrases and at least one subsystem that associates the key words or key phrases with pre-determined offers or services. Other subsystems may receive user inputs specifying business rules which identify life event parameters associated with customer demand for insurance policy products and services. A plurality of recorded conversations may be retrieved and analyzed based upon customer relations management (CRM) data and the business rules to determine lost opportunities for offers or services, and identify trends or patterns that may define new offers or services.

In another aspect, a system for providing phone conversation analysis comprises at least one subsystem that monitors a phone conversation for key words or key phrases and at least one subsystem that tracks, in a customer's record, pre-determined offers or services associated with the key words and key phrases.

Below is a description of other advantages and features of the invention.

BRIEF DESCRIPTION OF THE DRAWINGS

Automated phone conversation analysis is further described with reference to the accompanying drawings in which.

DETAILED DESCRIPTION

Certain specific details are set forth in the following description and figures to provide a thorough understanding of various embodiments of the invention. Certain well-known details often associated with computing and software technology are not set forth in the following disclosure to avoid unnecessarily obscuring the various embodiments of the invention. Further, those of ordinary skill in the relevant art will understand that they can practice other embodiments of the invention without one or more of the details described below. Finally, while various methods are described with reference to steps and sequences in the following disclosure, the description as such is for providing a clear implementation of embodiments of the invention, and the steps and sequences of steps should not be taken as required to practice this invention.

Example Computing Devices

Figure 1:
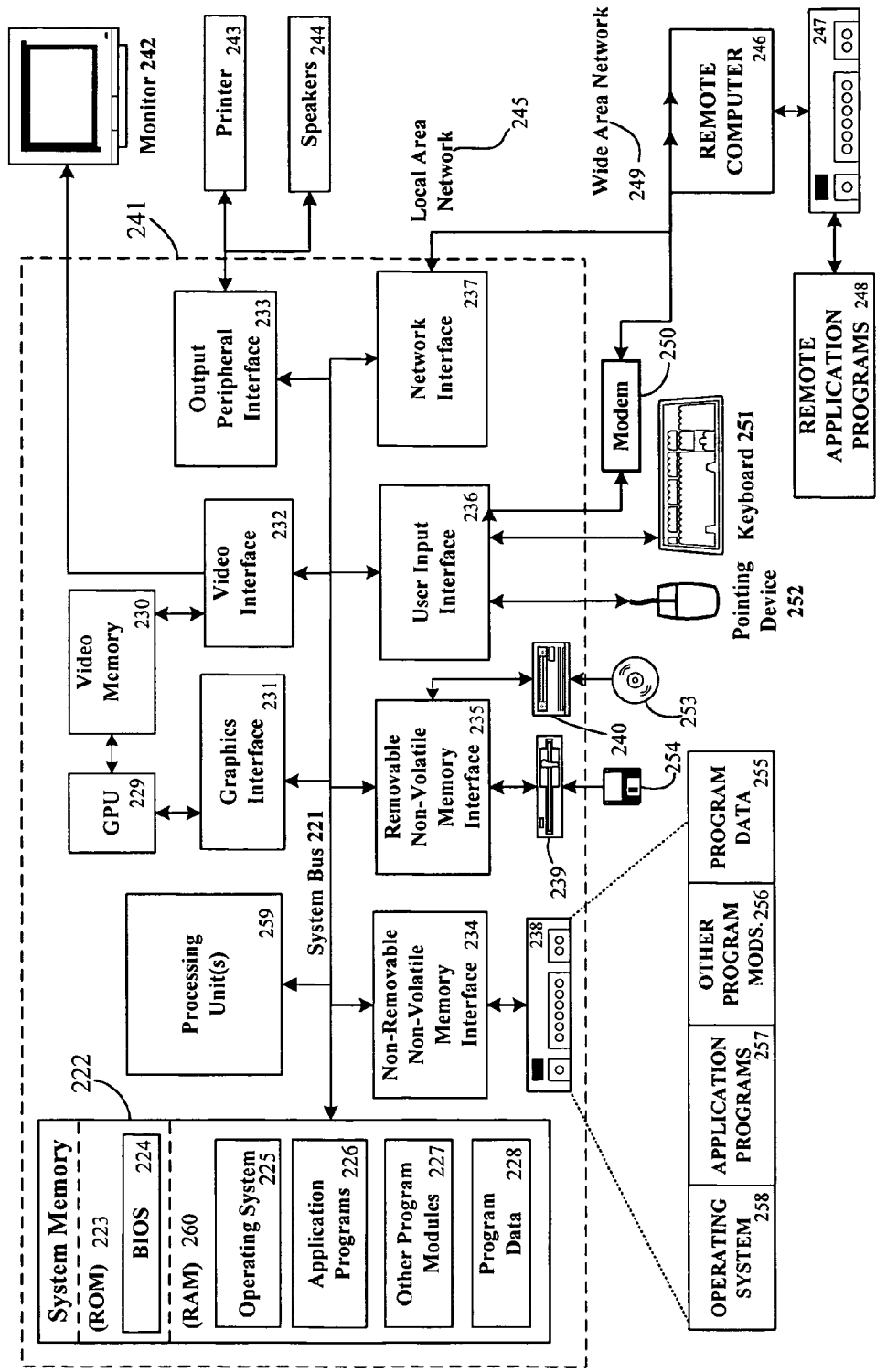
FIG. 1 is a block diagram representing an exemplary computing device suitable for use in conjunction with providing automated phone conversation analysis.

Referring to FIG. 1, shown is a block diagram representing an exemplary computing device suitable for use in conjunction with implementing the processes described above. For example, the computer executable instructions that carry out the processes and methods for automated phone conversation analysis may reside and/or be executed in such a computing environment as shown in FIG. 1. The computing system environment 220 is only one example of a suitable computing environment and is not intended to suggest any limitation as to the scope of use or functionality of the invention. Neither should the computing environment 220 be interpreted as having any dependency or requirement relating to any one or combination of components illustrated in the exemplary operating environment 220.

Aspects of the invention are operational with numerous other general purpose or special purpose computing system environments or configurations. Examples of well known computing systems, environments, and/or configurations that may be suitable for use with the invention include, but are not limited to, personal computers, server computers, hand-held or laptop devices, multiprocessor systems, microprocessor-based systems, set-top boxes, programmable consumer electronics, network PCs, minicomputers, mainframe computers, distributed computing environments that include any of the above systems or devices, and the like.

Aspects of the invention may be implemented in the general context of computer-executable instructions, such as program modules, being executed by a computer. Generally, program modules include routines, programs, objects, components, data structures, etc. that perform particular tasks or implement particular abstract data types. Aspects of the invention may also be practiced in distributed computing environments where tasks are performed by remote processing devices that are linked through a communications network. In a distributed computing environment, program modules may be located in both local and remote computer storage media including memory storage devices.

An exemplary system for implementing aspects of the invention includes a general purpose computing device in the form of a computer 241. Components of computer 241 may include, but are not limited to, a processing unit 259, a system memory 222, and a system bus 221 that couples various system components including the system memory to the processing unit 259. The system bus 221 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, the Peripheral Component Interconnect (PCI) bus also known as Mezzanine bus, as well as its successor, the PCI-Express standard.

Computer 241 typically includes a variety of computer readable media. Computer readable media can be any available media that can be accessed by computer 241 and includes both volatile and nonvolatile media, removable and non-removable media. By way of example, and not limitation, computer readable media may comprise computer storage media and communication media. Computer storage media includes both volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can accessed by computer 241. Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of the any of the above should also be included within the scope of computer readable media.

The system memory 222 includes computer storage media in the form of volatile and/or nonvolatile memory such as read only memory (ROM) 223 and random access memory (RAM) 260. A basic input/output system 224 (BIOS), containing the basic routines that help to transfer information between elements within computer 241, such as during start-up, is typically stored in ROM 223. RAM 260 typically contains data and/or program modules that are immediately accessible to and/or presently being operated on by processing unit 259. By way of example, and not limitation, FIG. 1 illustrates operating system 225, application programs 226, other program modules 227, and program data 228.

The computer 241 may also include other removable/non-removable, volatile/nonvolatile computer storage media. By way of example only, FIG. 1 illustrates a hard disk drive 238 that reads from or writes to non-removable, nonvolatile magnetic media, a magnetic disk drive 239 that reads from or writes to a removable, nonvolatile magnetic disk 254, and an optical disk drive 240 that reads from or writes to a removable, nonvolatile optical disk 253 such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 238 is typically connected to the system bus 221 through an non-removable memory interface such as interface 234, and magnetic disk drive 239 and optical disk drive 240 are typically connected to the system bus 221 by a removable memory interface, such as interface 235.

The drives and their associated computer storage media discussed above and illustrated in FIG. 1, provide storage of computer readable instructions, data structures, program modules and other data for the computer 241. In FIG. 1, for example, hard disk drive 238 is illustrated as storing operating system 258, application programs 257, other program modules 256, and program data 255. Note that these components can either be the same as or different from operating system 225, application programs 226, other program modules 227, and program data 228. Operating system 258, application programs 257, other program modules 256, and program data 255 are given different numbers here to illustrate that, at a minimum, they are different copies. A user may enter commands and information into the computer 241 through input devices such as a keyboard 251 and pointing device 252, commonly referred to as a mouse, trackball or touch pad. Other input devices (not shown) may include a microphone, joystick, game pad, satellite dish, scanner, or the like. These and other input devices are often connected to the processing unit 259 through a user input interface 236 that is coupled to the system bus, but may be connected by other interface and bus structures, such as a parallel port, game port or a universal serial bus (USB). A monitor 242 or other type of display device is also connected to the system bus 221 via an interface, such as an insecure or secure video interface 232. An exemplary secure video standard would be the High-Definition Multimedia Interface (HDMI) standard. In addition to the monitor, computers may also include other peripheral output devices such as speakers 244 and printer 243, which may be connected through a output peripheral interface 233.

The computer 241 may operate in a networked environment using logical connections to one or more remote computers, such as a remote computer 246. The remote computer 246 may be a personal computer, a server, a router, a network PC, a peer device or other common network node, and typically includes many or all of the elements described above relative to the computer 241, although only a memory storage device 247 has been illustrated in FIG. 1. The logical connections depicted in FIG. 1 include a local area network (LAN) 245 and a wide area network (WAN) 249, but may also include other networks. Such networking environments are commonplace in offices, enterprise-wide computer networks, intranets and the Internet.

When used in a LAN networking environment, the computer 241 is connected to the LAN 245 through a network interface or adapter 237. When used in a WAN networking environment, the computer 241 typically includes a modem 250 or other means for establishing communications over the WAN 249, such as the Internet. The modem 250, which may be internal or external, may be connected to the system bus 221 via the user input interface 236, or other appropriate mechanism. In a networked environment, program modules depicted relative to the computer 241, or portions thereof, may be stored in the remote memory storage device. By way of example, and not limitation, FIG. 1 illustrates remote application programs 248 as residing on memory device 247. It will be appreciated that the network connections shown are exemplary and other means of establishing a communications link between the computers may be used.

It should be understood that the various techniques described herein may be implemented in connection with hardware or software or, where appropriate, with a combination of both. Thus, the methods and apparatus of the invention, or certain aspects or portions thereof, may take the form of program code (i.e., instructions) embodied in tangible media, such as floppy diskettes, CD-ROMs, hard drives, or any other machine-readable storage medium wherein, when the program code is loaded into and executed by a machine, such as a computer, the machine becomes an apparatus for practicing the invention. In the case of program code execution on programmable computers, the computing device generally includes a processor, a storage medium readable by the processor (including volatile and non-volatile memory and/or storage elements), at least one input device, and at least one output device. One or more programs that may implement or utilize the processes described in connection with the invention, e.g., through the use of an API, reusable controls, or the like. Such programs are preferably implemented in a high level procedural or object oriented programming language to communicate with a computer system. However, the program(s) can be implemented in assembly or machine language, if desired. In any case, the language may be a compiled or interpreted language, and combined with hardware implementations.

Although exemplary embodiments may refer to utilizing aspects of the invention in the context of one or more stand-alone computer systems, the invention is not so limited, but rather may be implemented in connection with any computing environment, such as a network or distributed computing environment. Still further, aspects of the invention may be implemented in or across a plurality of processing chips or devices, and storage may similarly be effected across a plurality of devices. Such devices might include personal computers, network servers, handheld devices, supercomputers, or computers integrated into other systems such as automobiles and airplanes.

In light of the diverse computing environments that may be built according to the general framework provided in FIG. 1, the systems and methods provided herein cannot be construed as limited in any way to a particular computing architecture. Instead, the invention should not be limited to any single embodiment, but rather should be construed in breadth and scope in accordance with the appended claims.

Figure 2:
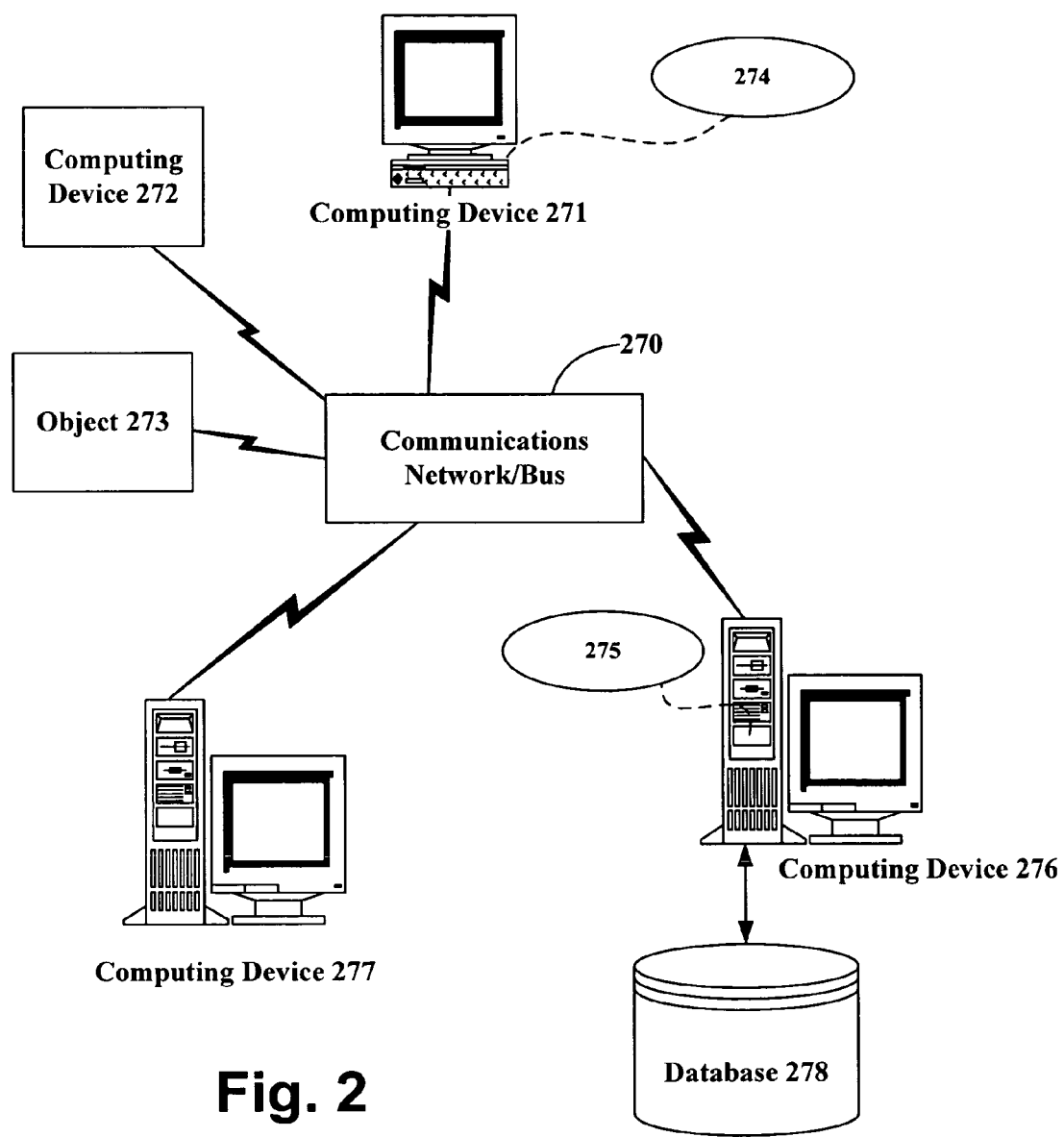
FIG. 2 illustrates an exemplary networked computing environment in which many computerized processes may be implemented to perform automated phone conversation analysis.

Referring next to FIG. 2, shown is an exemplary networked computing environment in which many computerized processes may be implemented to perform the processes described above. For example, parallel computing may be part of such a networked environment with various clients on the network of FIG. 2 using and/or implementing automated phone conversation analysis. One of ordinary skill in the art can appreciate that networks can connect any computer or other client or server device, or in a distributed computing environment. In this regard, any computer system or environment having any number of processing, memory, or storage units, and any number of applications and processes occurring simultaneously is considered suitable for use in connection with the systems and methods provided.

Distributed computing provides sharing of computer resources and services by exchange between computing devices and systems. These resources and services include the exchange of information, cache storage and disk storage for files. Distributed computing takes advantage of network connectivity, allowing clients to leverage their collective power to benefit the entire enterprise. In this regard, a variety of devices may have applications, objects or resources that may implicate the processes described herein.

FIG. 2 provides a schematic diagram of an exemplary networked or distributed computing environment. The environment comprises computing devices 271, 272, 276, and 277 as well as objects 273, 274, and 275, and database 278. Each of these entities 271, 272, 273, 274, 275, 276, 277 and 278 may comprise or make use of programs, methods, data stores, programmable logic, etc. The entities 271, 272, 273, 274, 275, 276, 277 and 278 may span portions of the same or different devices such as PDAs, audio/video devices, MP3 players, personal computers, etc. Each entity 271, 272, 273, 274, 275, 276, 277 and 278 can communicate with another entity 271, 272, 273, 274, 275, 276, 277 and 278 by way of the communications network 270. In this regard, any entity may be responsible for the maintenance and updating of a database 278 or other storage element.

This network 270 may itself comprise other computing entities that provide services to the system of FIG. 2, and may itself represent multiple interconnected networks. In accordance with an aspect of the invention, each entity 271, 272, 273, 274, 275, 276, 277 and 278 may contain discrete functional program modules that might make use of an API, or other object, software, firmware and/or hardware, to request services of one or more of the other entities 271, 272, 273, 274, 275, 276, 277 and 278.

It can also be appreciated that an object, such as 275, may be hosted on another computing device 276. Thus, although the physical environment depicted may show the connected devices as computers, such illustration is merely exemplary and the physical environment may alternatively be depicted or described comprising various digital devices such as PDAs, televisions, MP3 players, etc., software objects such as interfaces, COM objects and the like.

There are a variety of systems, components, and network configurations that support distributed computing environments. For example, computing systems may be connected together by wired or wireless systems, by local networks or widely distributed networks. Currently, many networks are coupled to the Internet, which provides an infrastructure for widely distributed computing and encompasses many different networks. Any such infrastructures, whether coupled to the Internet or not, may be used in conjunction with the systems and methods provided.

A network infrastructure may enable a host of network topologies such as client/server, peer-to-peer, or hybrid architectures. The "client" is a member of a class or group that uses the services of another class or group to which it is not related. In computing, a client is a process, i.e., roughly a set of instructions or tasks, that requests a service provided by another program. The client process utilizes the requested service without having to "know" any working details about the other program or the service itself. In a client/server architecture, particularly a networked system, a client is usually a computer that accesses shared network resources provided by another computer, e.g., a server. In the example of FIG. 2, any entity 271, 272, 273, 274, 275, 276, 277 and 278 can be considered a client, a server, or both, depending on the circumstances.

A server is typically, though not necessarily, a remote computer system accessible over a remote or local network, such as the Internet. The client process may be active in a first computer system, and the server process may be active in a second computer system, communicating with one another over a communications medium, thus providing distributed functionality and allowing multiple clients to take advantage of the information-gathering capabilities of the server. Any software objects may be distributed across multiple computing devices or objects.

Client(s) and server(s) communicate with one another utilizing the functionality provided by protocol layer(s). For example, HyperText Transfer Protocol (HTTP) is a common protocol that is used in conjunction with the World Wide Web (WWW), or "the Web." Typically, a computer network address such as an Internet Protocol (IP) address or other reference such as a Universal Resource Locator (URL) can be used to identify the server or client computers to each other. The network address can be referred to as a URL address. Communication can be provided over a communications medium, e.g., client(s) and server(s) may be coupled to one another via TCP/IP connection(s) for high-capacity communication.

In light of the diverse computing environments that may be built according to the general framework provided in FIG. 2 and the further diversification that can occur in computing in a network environment such as that of FIG. 2, the systems and methods provided herein cannot be construed as limited in any way to a particular computing architecture or operating system. Instead, the invention should not be limited to any single embodiment, but rather should be construed in breadth and scope in accordance with the appended claims.

Automated Phone Conversation Analysis

Figure 3:
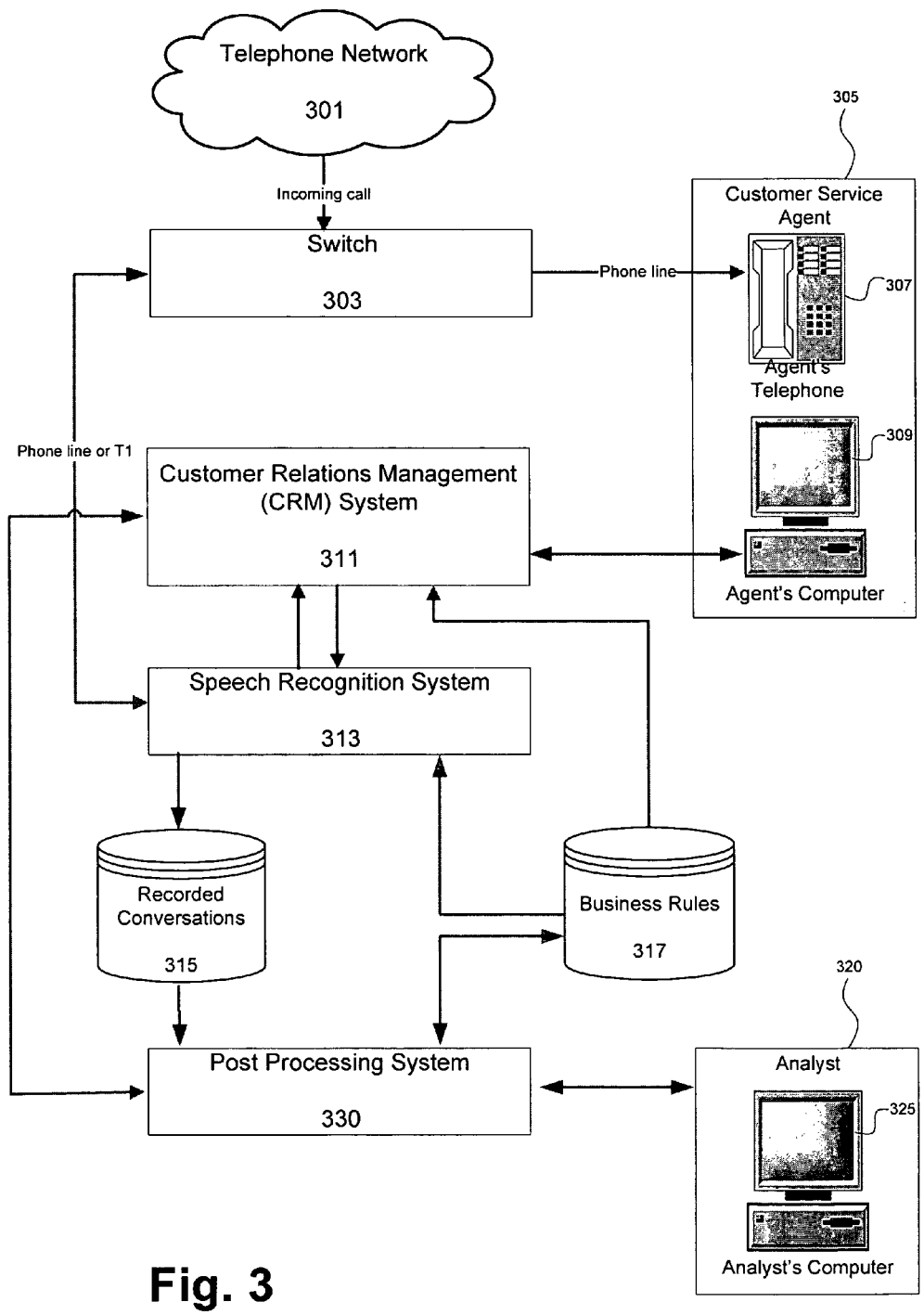
FIG. 3 is a block diagram illustrating a high level view of an example system for automated phone conversation analysis.

Referring next to FIG. 3, shown is a block diagram illustrating a high level view of an example system for automated phone conversation analysis. Shown is an external telephone network 301, a telephone switch 303, a customer service agent 305, (including their phone 307 and computer 309), a customer relations management system (CRM) 311, a speech recognition system 313, a persistent storage for recorded conversations 315, a persistent storage for business rules 317, an analyst 320, (including their computer 325). The switch 303 is operatively connected to the external telephone network 301, customer service agent 305, and speech recognition system 313 via phone lines or other network connections. Also, the speech recognition system is operatively connected to the CRM system 311, agent's computer 309, the recorded conversations persistent storage 315, and the business rules persistent storage 317 via computer network or computer bus connections, or via logical connections through interactions between various modules within a computer software program having functionality associated with the various blocks in FIG. 3. A post processing system 330 is operatively connected to the CRM system 311, analyst's computer 325, the recorded conversations persistent storage 315, and the business rules persistent storage 317 via computer network or computer bus connections, or via logical connections through interactions between various modules within a computer software program having functionality associated with the various blocks in FIG. 3.

The switch 303 routes an incoming call from an external telephone network 301 to the customer service agent's phone 307 and to the speech recognition system 313 for analysis of the phone conversation during the call. The phone conversation may also be stored in a persistent storage device 315 for subsequent analysis. The speech recognition system 313 takes the digital or analog audio signal from the call and performs speech recognition analysis to recognize one or more words spoken during the phone conversation. Speech recognition (in many contexts also known as automatic speech recognition, computer speech recognition or voice recognition) technology generally represent a set of technologies that allows computers equipped with a source of sound input, such as a microphone, to transform human speech into a sequence of words recorded in a computer data file. This is not to be confused with voice authentication (or speaker authentication), which recognizes only voice patterns as in security identification, or speaker identification which aims at identifying one speaker out of many. Speech recognition technology currently available may be used for recognizing words that are spoken during the phone conversation. Some examples of these technologies are provided below:

Many technical text books emphasize the use of Hidden Markov Model as the underlying technology. Though it should be noted that the use of dynamic algorithm approach, neural network-based approach and knowledge-based approach are also viable. Certain systems can recognize natural human speech which has the property of words "sticking together" (or coarticulated together). This is usually called continuous speech (continuous speech recognition). Some systems also use the terms connected word recognition. These types of systems are, for example, particularly suited for use in conjunction with the automated phone conversation analysis systems described herein. However, other speech recognition systems and technologies may be applicable as well.

Speech recognition technology is available from a variety of sources. For example OpenSpeech® Recognizer (OSR) speech recognition software is available from Nuance Communications, Inc., a computer software technology company headquartered in Burlington, Mass. It uses statistical language models (SLMs) and statistical semantic models (SSMs) that determine what a caller means in addition to the words they said.

These words, phrases or meanings are analyzed individually or to determine whether they trigger particular actions resulting from business rules stored in the business rules storage 317. If they do, the particular actions may be taken during or after the phone call as determined by the rules 317. The CRM system 311, in communication with the speech recognition system 313 and agent's computer 309, executes the particular rules based on the analysis performed within the speech recognition system 313. For example, these actions may include, but are not limited to: presenting the caller with certain offers, advice, solutions or products during the phone conversation with the agent 305. The CRM system 311 may notify the agent via the agent's computer 309, for example, of which actions to take. These notifications may include, but are not limited to: a pop-up message on the agent's computer 309, an icon appearing on the agent's computer 309, a text or email message, an audio signal, etc., and may include information for the customer or agent within the notification or further instructions within the notification for the agent or customer. The speech recognition system 313 may also tag certain locations within the conversation that have been identified by the business rules 317 as being a searchable parameter. Identification tags or anchors are thus inserted with, for example, the aforementioned words, phrases or meanings, in order to facilitate rapid searching for subsequent analysis. Such an analysis may be initiated by an analyst 320 utilizing the analyst computer 325, utilizing CRM system 311, business rules 317, and post processing system 330.

Figure 4:
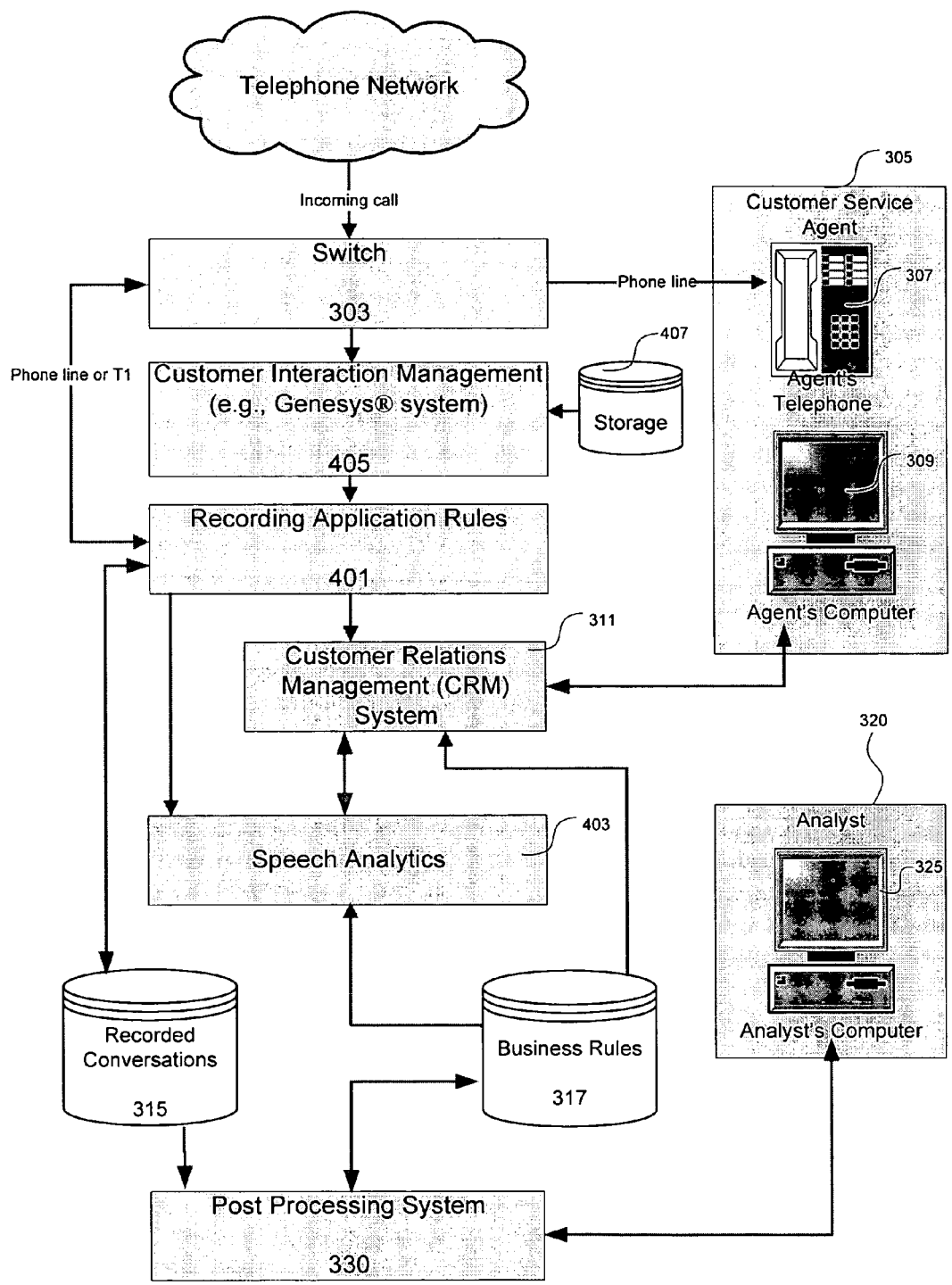
FIG. 4 is a block diagram illustrating a lower level view of an example system for automated phone conversation analysis.

Referring next to FIG. 4, shown is a block diagram illustrating a lower level view of an example system for automated phone conversation analysis. Shown is an external telephone network 301, a telephone switch 303, a customer interaction management system 405, a customer service agent 305, (including their phone 307 and computer 309), a recording application rules module 401, a customer relations management system (CRM) 311, a speech analytics system 403, a persistent storage for recorded conversations 315, a persistent storage for business rules 317, a persistent storage for the customer interaction management 405 system, analyst 320 (including analyst computer 325), and post processing system 330.

In comparison to FIG. 3, there is an additional component in FIG. 4 for customer interaction management 405. This is an automated system such as that available from Genesys Telecommunications Laboratories, Inc. located in Daly City, Calif. The Genesys® software platform provides functionality to identify callers, route calls, report caller statistics and provides a voice portal system to offer self-service resources over the phone to customers. The speech recognition system of FIG. 3 is broken down into two components shown in FIG. 4: the recording application rules module 401 and the speech analytics module 403. The recording application rules module 401 is in communication with the customer interaction management system 405. The customer interaction management system 405 may provide information regarding a call or number of calls to the recording application rules module 401 such that the recording application rules module 401 may make a determination of which calls to record based on random selection or other particular criteria provided in the recording application rules 401. The speech analytics system 403 provides the speech recognition and analysis as described above based upon the business rules 317. The post processing system may consist of a collection of software programs running on a server, which may provide analysis functions such as short and long term trending, with various trending parameters that are selectable by the analyst 320. Other programs may process a subset of the recorded and tagged conversations, comparing key words and phrases with the business rules to determine if a product or service should have been offered, but was not.

Figure 5:
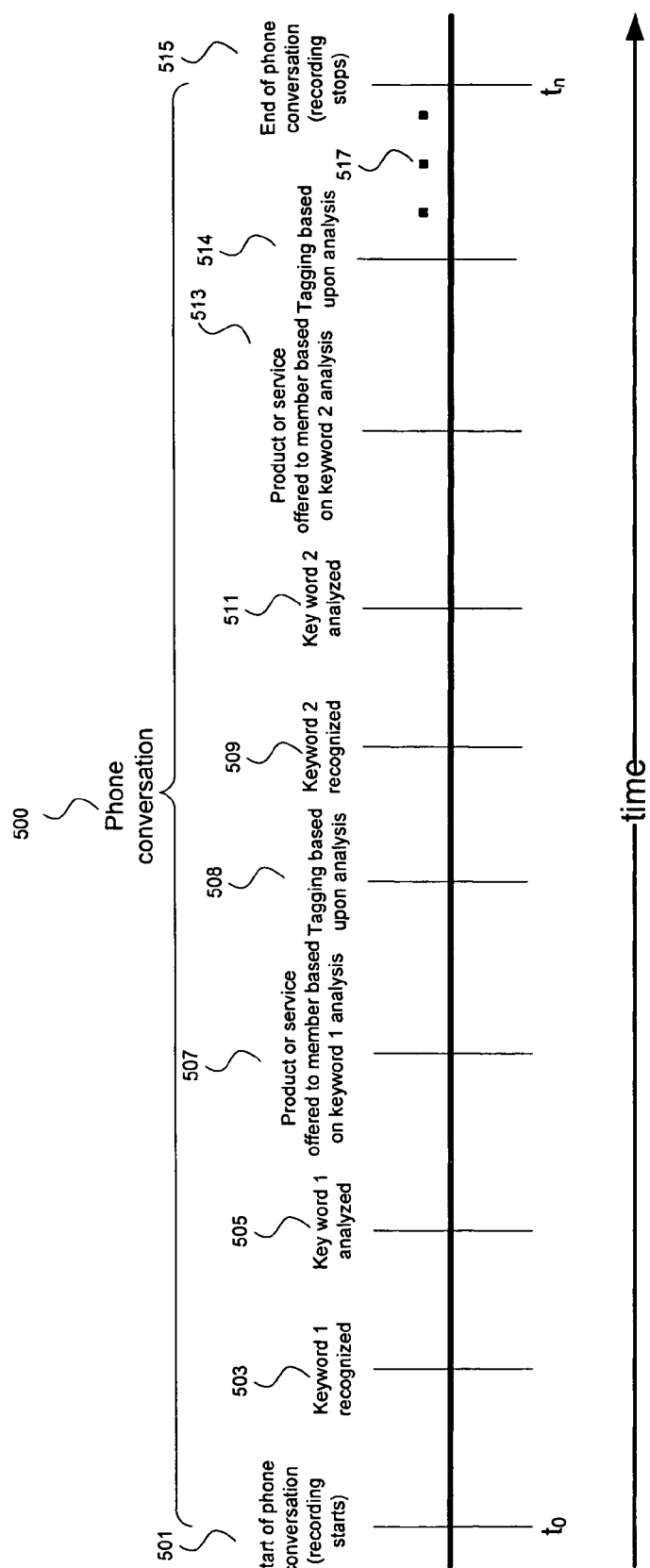
FIG. 5 is a time line chart of an example phone conversation in which an example of automated phone conversation analysis occurs.

Referring next to FIG. 5, shown is a time line chart of an example phone conversation in which an example of automated phone conversation analysis occurs. Key word recognition, analysis and associated actions based on the analysis may be happening continuously and/or in parallel during a given phone conversation. Thus, the timeline of FIG. 5, provides an example sequence of events that may occur during a phone conversation, but the events may occur in a different order or take a longer or shorter amount of time to perform than shown in FIG. 5. The order in which the recognition, analysis and associated actions based on the analysis occur, as well as the amount of time they take to occur depend on a number of factors such as the processing speed of the computing environment, the efficiency of the speech recognition and analytics software, the quality of the audio in the phone call, the complexity of the analysis required, the rate at which the caller is speaking, the type of product or service offered to the customer or member, etc. However, generally, a key word or phrase is first recognized before it is analyzed, and is analyzed before a product or service can be offered, or before the recording can be tagged, based upon the analysis of the key word or phrase. For example, in FIG. 5, after the start 501 of the phone conversation 500 at time $t_0$ (which may also be recorded), the caller says key word 1. This key word is recognized 503 and analyzed 505 to determine which product or service should be offered to the customer or member, or determine key search terms with which to tag the recorded conversation. Then the product or service is actually offered 507 to the customer or member over the phone, or the recorded conversation is tagged at 508 during the phone conversation 500. This process repeats for another key word, say key word 2. The caller says key word 2. This key word is recognized 509 and analyzed 511 to determine which product or service should be offered to the customer or member, or determine key search terms with which to tag the recorded conversation. Then the product or service is actually offered 513 to the customer or member over the phone during the phone conversation 500 or the recorded conversation is tagged at 514. This process may repeat for other key word(s) or phrases until the phone conversation ends 515. At the completion of the above process, the entire conversation, which has been tagged with keywords and phrases to enable subsequent retrieval and analysis, is stored.

Figure 6:
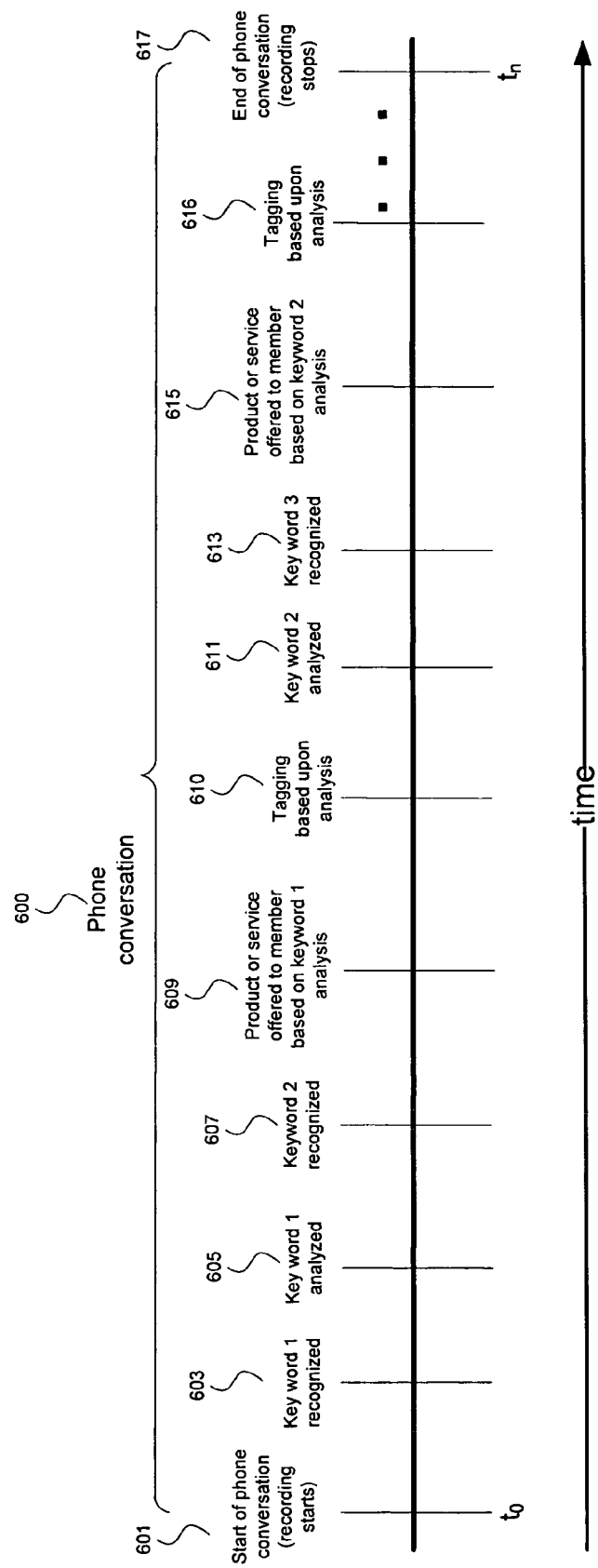
FIG. 6 is a time line chart of an example phone conversation in which a second example of automated phone conversation analysis occurs.

Referring next to FIG. 6, shown is a time line chart of an example phone conversation in which a second example of automated phone conversation analysis occurs. The example of FIG. 6 shows what may occur when a first and different second key word is recognized during the conversation before the product or service associated with the first key word has a chance to be offered to the customer, or in rapid succession such that a single point in the conversation can be tagged with more than one searchable term. For example, in FIG. 6, after the start 601 of the phone conversation 600 at time $t_0$, the caller says key word 1. This key word is recognized 603 and analyzed 605 to determine which product or service should be offered to the customer or member, or which search term should be applied to this location in the conversation. However, before the product or service is actually offered 609 to the customer or the location is tagged, a second key word is spoken and recognized 607. Thus, in contrast to FIG. 5, the key word recognition of key word 2 occurs before the product or service is actually offered or the location is actually tagged 610. However, these processes may also be overlapping, occurring simultaneously, or in parallel. For example, the analysis 605 of key word 1 may end after key word 2 is recognized 607. There also may be synchronization rules, etc. that govern which processes, if any, may overlap. In the example of FIG. 6, after the product or service associated with key word 1 is offered, or the term has been tagged 609, key word 2 is analyzed 611, key word 3 is spoken and then recognized 613 before the product or service associated with key word 3 is actually offered or the location is tagged 616. This process, or variations on this process, may repeat for other key word(s) or phrases until the phone conversation ends 617 and the entire tagged conversation is stored.

Figure 7:
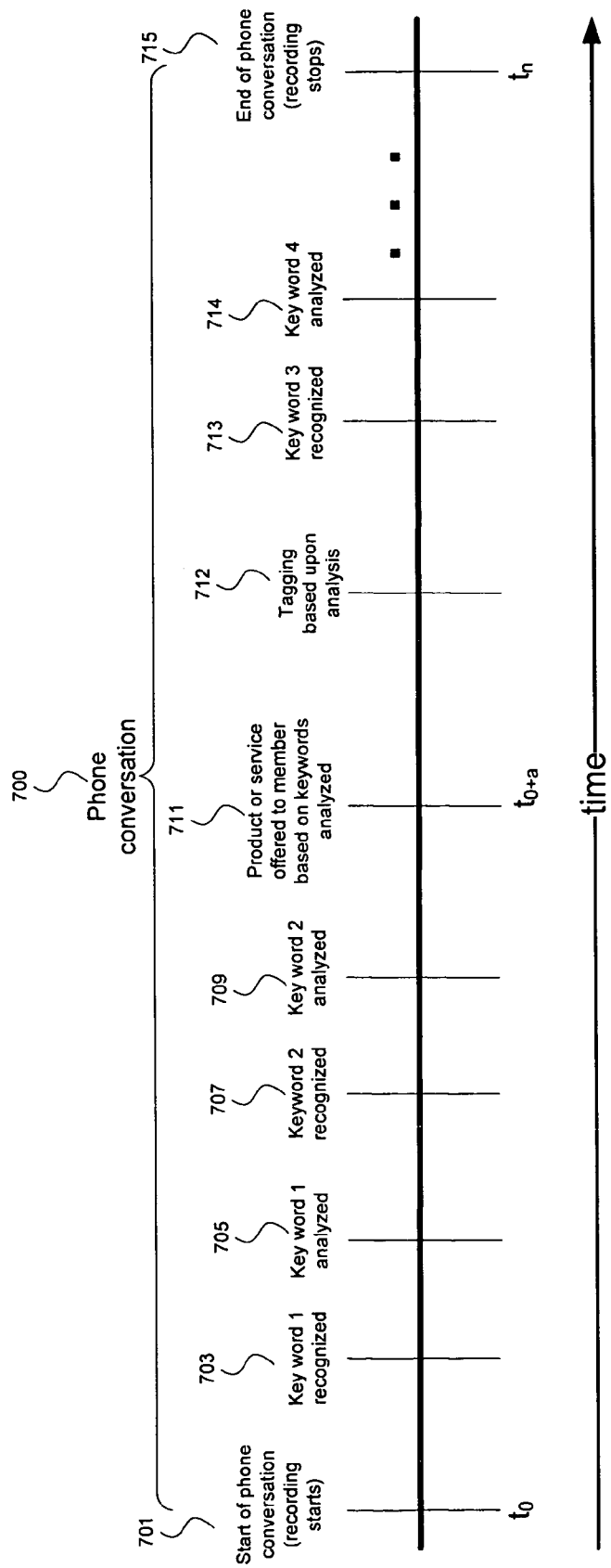
FIG. 7 is a time line chart of an example phone conversation in which a third example of automated phone conversation analysis occurs.

Referring next to FIG. 7, shown is a time line chart of an example phone conversation in which a third example of automated phone conversation analysis occurs. The timeline of FIG. 7 shows a sequence of events that results from a process of analysis that waits a pre-determined period of time (or pre-determined number of key words) before the product or service associated with previous key words or phrases is actually offered 711 or the conversation is tagged. This may serve to provide a better or more complete analysis of the phone conversation by waiting to collect more information (e.g., key words or phrases) to make a more intelligent choice of what, if any, product or service to offer the customer, or which search terms to use for the tagging. For example, after the start 701 of the phone conversation 700 at time $t_0$, the system waits until time $t_{0+a}$ to determine which product or service should be offered 711 to the customer or member, or which search terms should be applied based on the previous key words recognized 703 707 and analyzed 709. Or perhaps the system was waiting for both particular key words key word 1 and key word 2 to be recognized and analyzed before offering (or notifying to agent to offer) the product or service to the customer, or before tagging the recorded conversation 712. The customer may speak other key words or phrases such as key word 3 713 and key word 4 714 and this process, or variations on this process, may repeat for the other key word(s) or phrases until the phone conversation ends 715. In this way, the phone conversation analysis may be provided in real-time, near real time, or before the phone conversation ends. Furthermore, this process enables the most efficient and effective means of tagging the conversation for later retrieval and analysis. Although the processes described above have been with respect to key words spoken by the customer, the same or similar processes may also be applied to the same or different key words spoken by the agent speaking with the customer.

Figure 8:
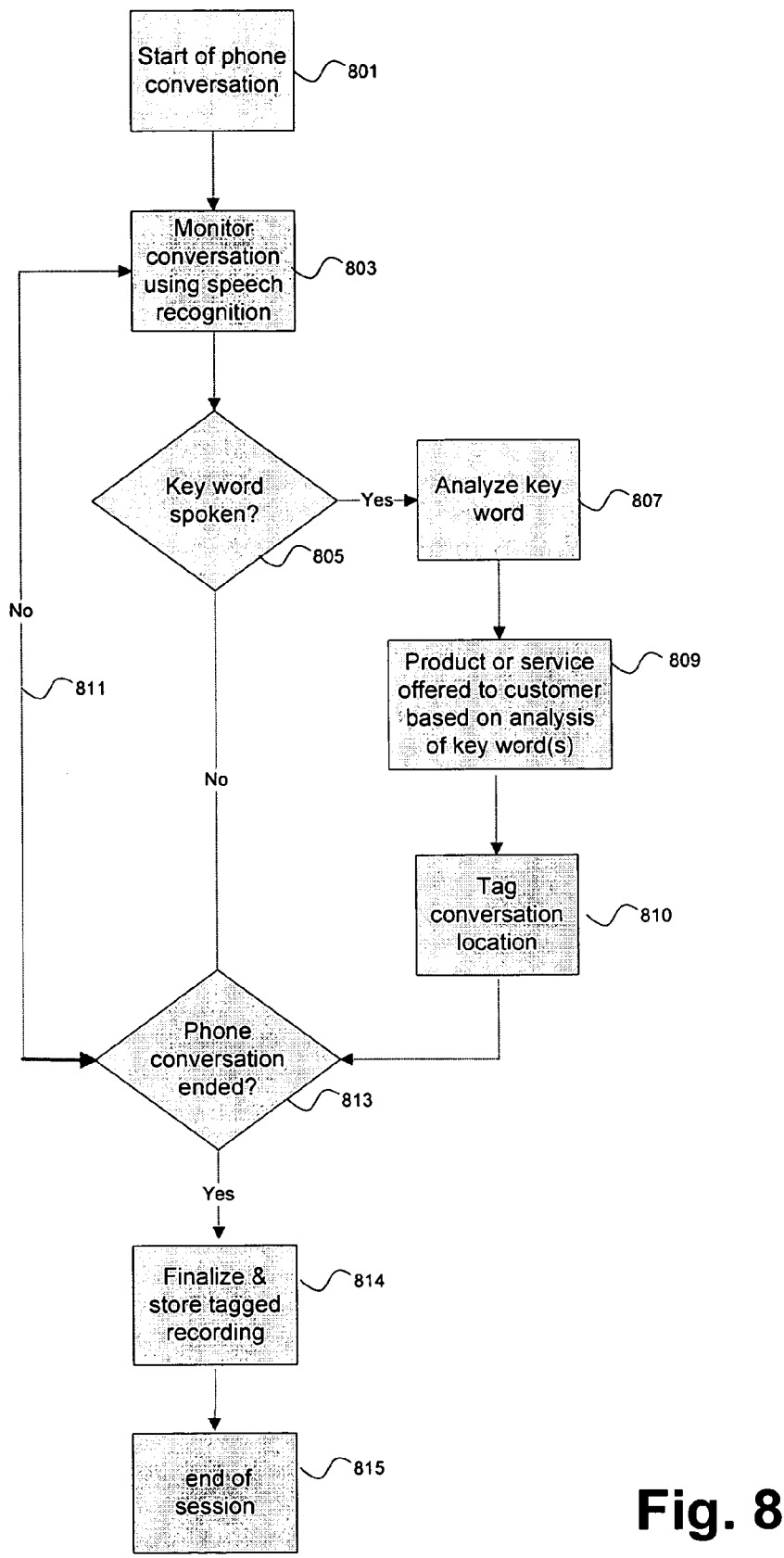
FIG. 8 is a flow diagram illustrating an example process for automated phone conversation analysis.

Referring next to FIG. 8, shown is a flow diagram illustrating one example process for automated phone conversation analysis. For example, after the start of a phone conversation 801, the conversation is monitored 803 using an automated speech recognition system. At the time (or soon after) certain key word(s) or phrase(s) are spoken 805, the key word(s) or phrase(s) are analyzed to determine what action to take based upon the particular key word or phrase, and whether to tag that portion of the conversation. For example, a product or service is then offered 809 (or the agent is notified to provide an offer for the product or service) to the customer during the phone conversation based on the analysis of the key word. At this point the location of the conversation is tagged 810 with the appropriate search attributes. This process may repeat 811, until the phone conversation has ended 813, at which point the tagged conversation will be finalized and stored 814 and the analysis session will end 815.

Figure 9:
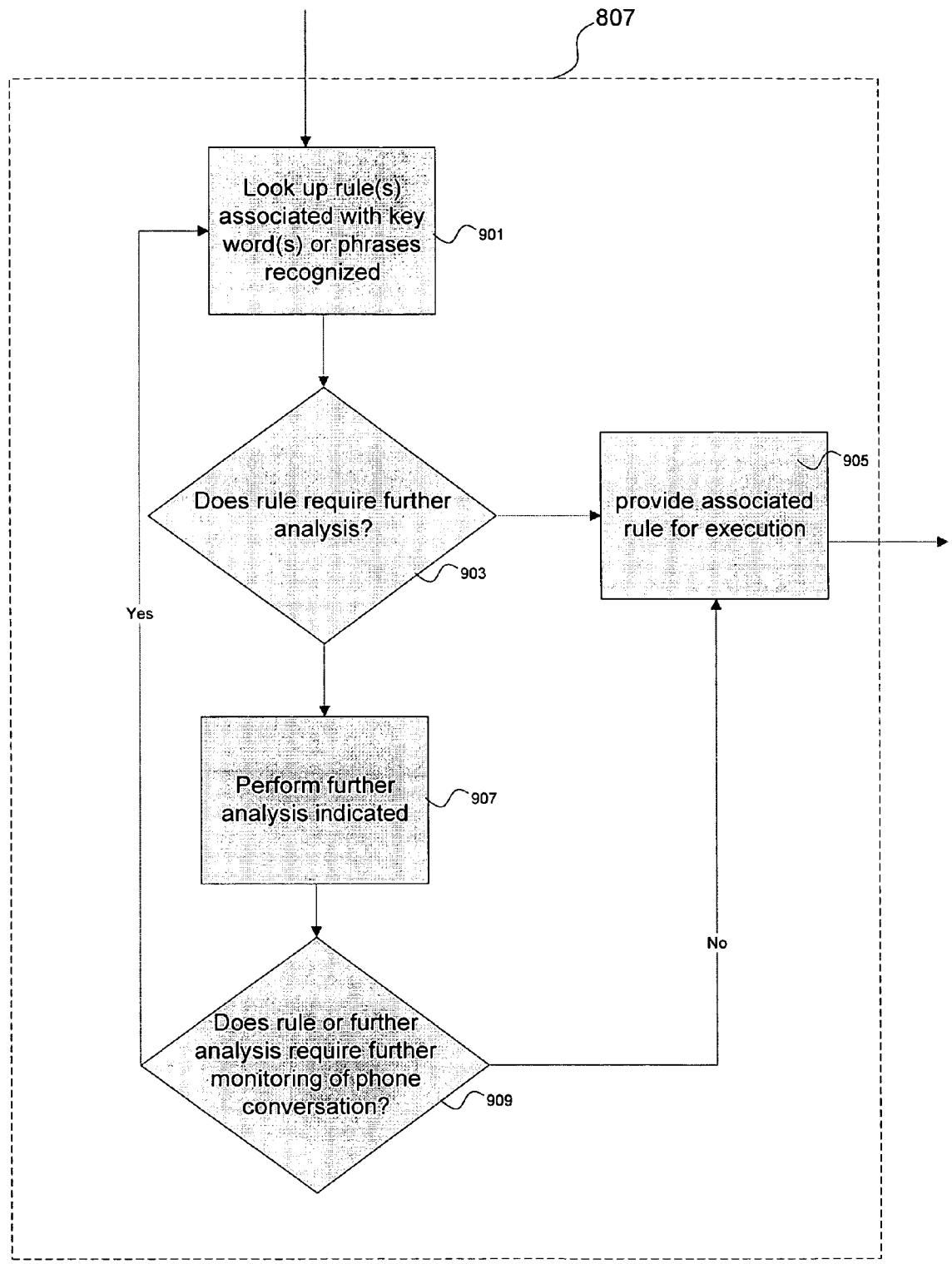
FIG. 9 is a flow diagram illustrating an example process for analysis of key words or phrases within the automated phone conversation analysis process of FIG. 8.

Referring next to FIG. 9, shown is a flow diagram illustrating an example process for analysis of key words or phrases within the automated phone conversation analysis process of FIG. 8. To perform analysis of the key word spoken, the rule associated with the key word is looked up 901 in a database containing the key words and their associated rules. The rules may contain specific actions to perform including, but not limited to: presenting the caller with, or providing the agent a notification to present the caller with certain offers, advice, solutions or products during the phone conversation with the agent, require further analysis, require further monitoring pf phone conversation, transfer the call, record the call (if it is not already being recorded), call or alert a manager or notify the agent to contact a manager, etc. An example may be that the customer speaks the key words "college" and "son" or daughter," and the agent is then notified on their computer to offer the customer a product related to a college investment account for their child. Or perhaps, the customer speaks the words "moving" or "job transfer" or "PCS" (permanent change of station) and the agent is notified to offer the customer real estate and moving services. It is then determined 903 whether the rule requires further analysis of the conversation phone conversation. If the rule does not require further analysis of the conversation, then the particular rule is provided 905 for execution at that moment. If the rule does require further analysis of the conversation, then such further analysis is performed 907. This further analysis may be, for example, to determine what type of call, who the caller is, what type of accounts the caller has and other data to perform a proper analysis before providing 905 the associated rule for execution. It is also determined 909 whether the rule requires further monitoring of the phone conversation before the final rule can be provided 905 for execution. In this case, the process may repeat and process 901 other key words in order to complete the analysis.

Figure 10:
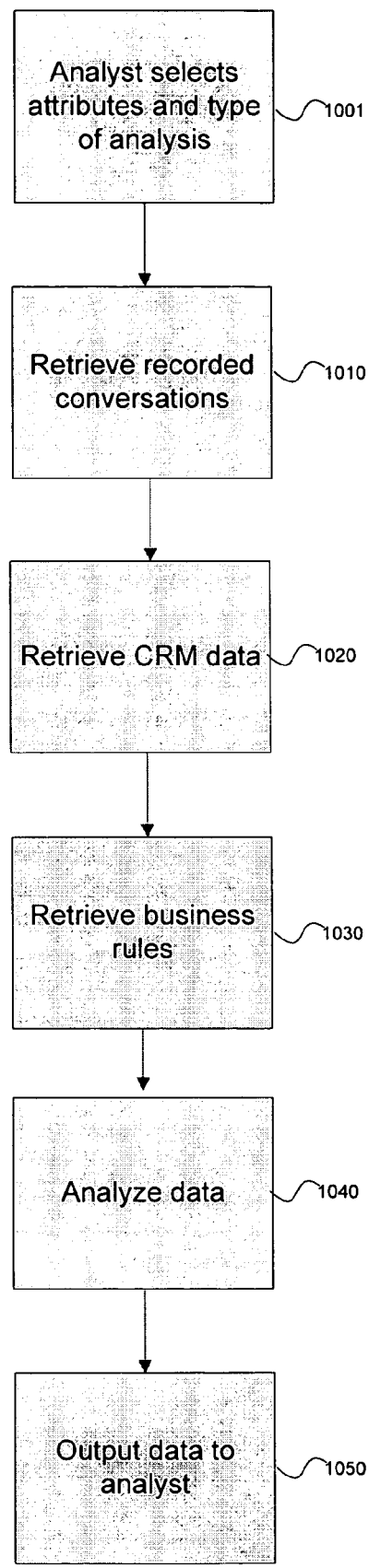
FIG. 10 is a flow diagram illustrating an example process for post-conversation analysis of the tagged and stored phone conversations utilizing analysis attributes selected by an analyst.

In another embodiment, referring next to FIG. 10, shown is a flow diagram illustrating an example process for post-call analysis of the recorded conversations. To perform analysis of one or more recorded conversations, an analyst inputs attributes (such as key words), rules, and types of analysis that are to be performed 1001. Any number of tagged attributes and desired analyses can be input by the analyst, either manually or using automated means. For example, an analyst may use a workstation using a software program to select various attributes for analysis or trending. The recorded and tagged phone conversations are retrieved by the post processing system 1010. If necessary, CRM data is retrieved 1020. The rule associated with the attribute or key word is looked up 1030 in a database containing the associated rules. The rules may contain specific actions that should have been performed including, but not limited to: presenting the caller with, or providing the agent a notification to present the caller with certain offers, advice, solutions or products during the phone conversation with the agent, require further analysis, require further monitoring pf phone conversation, transfer the call, record the call (if it is not already being recorded), call or alert a manager or notify the agent to contact a manager, etc. An example may be that the customer speaks the key words "college" and "son" or daughter," and the agent is then notified on their computer to offer the customer a product related to a college investment account for their child. Or perhaps, the customer speaks the words "moving" or "job transfer" or "PCS" (permanent change of station) and the agent is notified to offer the customer real estate and moving services. The analysis is performed 1040 and the results are presented to the analyst 1050 at the analyst's computer, or in printed form, or any other means selected by the analyst.

The various systems, methods, and techniques described herein may be implemented with hardware or software or, where appropriate, with a combination of both. Thus, the methods and apparatus of the present invention, or certain aspects or portions thereof, may take the form of program code (i.e., instructions) embodied in tangible media, such as floppy diskettes, CD-ROMs, hard drives, or any other machine-readable storage medium, wherein, when the program code is loaded into and executed by a machine, such as a computer, the machine becomes an apparatus for practicing the invention. In the case of program code execution on programmable computers, the computer will generally include a processor, a storage medium readable by the processor (including volatile and non-volatile memory and/or storage elements), at least one input device, and at least one output device. One or more programs are preferably implemented in a high level procedural or object oriented programming language to communicate with a computer system. However, the program(s) can be implemented in assembly or machine language, if desired. In any case, the language may be a compiled or interpreted language, and combined with hardware implementations.

The methods and apparatus of the present invention may also be embodied in the form of program code that is transmitted over some transmission medium, such as over electrical wiring or cabling, through fiber optics, or via any other form of transmission, wherein, when the program code is received and loaded into and executed by a machine, such as an EPROM, a gate array, a programmable logic device (PLD), a client computer, a video recorder or the like, the machine becomes an apparatus for practicing the invention. When implemented on a general-purpose processor, the program code combines with the processor to provide a unique apparatus that operates to perform the functionality of the systems and methods described herein.

While the present invention has been described in connection with the preferred embodiments of the various figures, it is to be understood that other similar embodiments may be used or modifications and additions may be made to the described embodiment for performing the same function of the present invention without deviating there from. Furthermore, it should be emphasized that a variety of computer platforms, including handheld device operating systems and other application-specific hardware/software interface systems, are herein contemplated, especially as the number of wireless networked devices continues to proliferate. Therefore, the present invention should not be limited to any single embodiment, but rather construed in breadth and scope in accordance with the appended claims.

Finally, the disclosed embodiments described herein may be adapted for use in other processor architectures, computer-based systems, or system virtualizations, and such embodiments are expressly anticipated by the disclosures made herein and, thus, the present invention should not be limited to specific embodiments described herein but instead construed most broadly.

What is claimed:

1. A non-transitory computer-readable storage medium comprising instructions for storing and recalling insurance company call center phone conversations comprising:
   instructions for analyzing a phone conversation between a customer and an agent of the insurance company call center in real time utilizing voice recognition techniques;
   instructions for identifying attributes of the phone conversation while utilizing the voice recognition techniques during the phone conversation, wherein the attributes are associated with customer relations management (CRM) information and include key words or phrases spoken during the phone conversation by at least the customer calling the call center;
   instructions for tagging the phone conversation with the attributes to enable access to specific locations within the phone conversation;
   instructions for analyzing the attributes to determine whether to notify the agent to offer the customer a product;
   instructions for storing said tagged phone conversation;
   instructions for receiving and storing user inputs specifying business rules which identify life event parameters associated with customer demand for insurance policy products and services, wherein a life event is defined as a change in status of an insurance customer related to a need for new or additional insurance products or services;
   instructions for receiving user input selecting at least one of said tagged attribute;
   instructions for retrieving at least one of the phone conversations based upon said user input;
   instructions for retrieving CRM data associated with the customer who engaged in the phone conversation, wherein the CRM data includes life events; and
   instructions for analyzing the at least one phone conversation based upon said CRM data and said business rules.

2. The non-transitory computer-readable storage medium of claim 1 further comprising instructions for converting the phone conversation to a digital audio file and wherein the instructions for storing include instructions for storing the digital audio file.

3. The non-transitory computer-readable storage medium of claim 1 further comprising instructions for performing a voice to text conversion of the phone conversation and wherein the instructions for storing includes instructions for storing the text.

4. The non-transitory computer-readable storage medium of claim 1 further comprising instructions for performing a voice to text conversion of the phone conversation and wherein the instructions for tagging is comprised of instructions for tagging the text file, and the instructions for storing is comprised of instructions for storing the tagged text file.

5. The non-transitory computer-readable storage medium of claim 1 wherein the attributes include key words or phrases associated with life events, wherein a life event is defined as a change in status of an insurance customer related to a need for new or additional insurance products or services.

6. The non-transitory computer-readable storage medium of claim 1 further comprising instructions for capturing and storing agent computer screen displays accessed during the phone conversation.

7. The non-transitory computer-readable storage medium of claim 6 wherein the stored screen displays are tagged to indicate the specific location within the phone conversation during which the display was accessed.

8. A non-transitory computer-readable storage medium comprising instructions for analyzing insurance company call center phone conversations comprising:
   instructions for analyzing a phone conversation between a customer and an agent of the insurance company call center in real time utilizing voice recognition techniques;
   instructions for identifying attributes of the phone conversation while utilizing the voice recognition techniques during the phone conversation, wherein the attributes include key words or phrases spoken during the phone conversation by at least the customer calling the call center;
   instructions for tagging the phone conversation with the attributes to enable access to specific locations within the phone conversation;
   instructions for analyzing the attributes to determine whether to notify the agent to offer the customer a product;
   instructions for storing said tagged phone conversation;
   instructions for receiving and storing user inputs specifying business rules which identify life event parameters associated with customer demand for insurance policy products and services, wherein a life event is defined as a change in status of an insurance customer related to a need for new or additional insurance products or services;
   instructions for receiving user input selecting at least one of said tagged attribute;
   instructions for retrieving at least one of the phone conversations based upon said user input;
   instructions for retrieving CRM data associated with the customer who engaged in the phone conversation, wherein the CRM data includes life events; and
   instructions for analyzing the at least one phone conversation based upon said CRM data and said business rules.

9. The non-transitory computer-readable storage medium of claim 8 further comprising instructions for determining whether the conversation resulted in missed opportunities, wherein a missed opportunity is defined as an instance where an insurance product or service associated with predefined key words or key phrases should have been offered but was not.

10. The non-transitory computer-readable storage medium of claim 8 wherein the business rules are modified by human agents.

11. The non-transitory computer-readable storage medium of claim 8 wherein the business rules are automatically and dynamically updated based upon predetermined criteria.

12. The non-transitory computer-readable storage medium of claim 8 further comprising instructions for providing notification to at least one agent or manager when the analysis meets at least one predefined criteria.

13. The non-transitory computer-readable storage readable medium of claim 8 wherein the attributes are modified by human agents.

14. The non-transitory computer-readable storage medium of claim 8 wherein the attributes include a tag for agent training, and wherein the instructions for retrieving is based upon searching for said tag for agent training.

15. A non-transitory computer-readable storage medium comprising instructions for analyzing insurance company call center phone conversations comprising:
   instructions for analyzing a phone conversation between a customer and an agent of the insurance company call center in real time utilizing voice recognition techniques;
   instructions for identifying attributes of the phone conversation while utilizing the voice recognition techniques during the phone conversation, wherein the attributes include key words or phrases spoken during the phone conversation by at least the customer calling the call center;
   instructions for tagging the phone conversation with the attributes to enable access to specific locations within the phone conversation;
   instructions for analyzing the attributes to determine whether to notify the agent to offer the customer a product;
   instructions for storing said tagged phone conversation;
   instructions for receiving and storing user inputs specifying business rules which identify life event parameters associated with customer demand for insurance policy products and services, wherein a life event is defined as a change in status of an insurance customer related to a need for new or additional insurance products or services;
   instructions for retrieving a plurality of said phone conversations based upon the tagged attributes;
   instructions for retrieving customer relations management (CRM) data associated with said plurality of phone conversations, wherein the CRM data includes life events;
   instructions for analyzing the plurality of phone conversations based upon said CRM data and said business rules; and
   instructions for determining patterns or relationships based upon said analysis.

16. The non-transitory computer-readable storage medium of claim 15 wherein the instructions for retrieving a plurality of phone conversations and CRM data is further comprised of instructions for retrieving data over a predefined time span and the instructions for analyzing comprises instructions for performing a trend analysis to determine the need for new or additional services.

17. The non-transitory computer-readable storage medium of claim 16 wherein the predefined time span is short term and the retrieved data is limited to location, time span, or other finite set of parameters to determine the need for new or additional services.

18. The non-transitory computer-readable storage medium of claim 16 wherein the predefined time span is long term and the retrieved data is selected over a broad range of at least one parameter to determine the need for new or additional services.

19. The non-transitory computer-readable storage medium of claim 16, wherein the trend analysis is performed over a plurality of time spans and using a plurality of retrieved data to determine the need for new or additional services.

20. The non-transitory computer-readable storage medium of claim 15 further comprising instructions for providing notification to at least one agent or manager when the pattern or relationship meets at least one predefined criteria.

21. The non-transitory computer-readable storage medium of claim 15 further comprising instructions for automatically suggesting new or changed business rules and policies based upon the pattern or relationship.

* * * * *